(12) United States Patent
Van Der Merwe

(10) Patent No.: US 9,969,409 B2
(45) Date of Patent: May 15, 2018

(54) AUTOMATED IN MOTION RAILWAY SEISMIC WHEEL FAILURE DETECTION SYSTEM

(71) Applicant: Frank Carl Van Der Merwe, Port Coquitlam (CA)

(72) Inventor: Frank Carl Van Der Merwe, Port Coquitlam (CA)

( * ) Notice: Subject to any disclaimer, the term of this patent is extended or adjusted under 35 U.S.C. 154(b) by 175 days.

(21) Appl. No.: 14/685,283

(22) Filed: Apr. 13, 2015

(65) Prior Publication Data
US 2016/0129924 A1    May 12, 2016

(30) Foreign Application Priority Data

Nov. 12, 2014  (CA) ..................... 2870425

(51) Int. Cl.
| | |
|---|---|
| *G01V 1/22* | (2006.01) |
| *B61L 29/28* | (2006.01) |
| *B61K 9/00* | (2006.01) |
| *G01M 17/10* | (2006.01) |
| *B61L 13/00* | (2006.01) |
| *B61L 25/02* | (2006.01) |
| *B61L 25/04* | (2006.01) |
| *G07C 5/00* | (2006.01) |
| *G01H 1/08* | (2006.01) |
| *G01H 1/16* | (2006.01) |
| *G01V 1/30* | (2006.01) |

(52) U.S. Cl.
CPC ............. *B61K 9/00* (2013.01); *B61L 13/002* (2013.01); *B61L 25/025* (2013.01); *B61L 25/04* (2013.01); *G01H 1/08* (2013.01); *G01H 1/16* (2013.01); *G01M 17/10* (2013.01); *G07C 5/008* (2013.01); *G01V 1/223* (2013.01); *G01V 1/305* (2013.01)

(58) Field of Classification Search
None
See application file for complete search history.

(56) References Cited

U.S. PATENT DOCUMENTS

| | | | | |
|---|---|---|---|---|
| 4,532,618 A | * | 7/1985 | Wener ................... | G01V 1/288 367/46 |
| 6,216,985 B1 | * | 4/2001 | Stephens ................. | B61K 9/10 246/120 |

(Continued)

FOREIGN PATENT DOCUMENTS

CN            201980253 U   *  9/2011

*Primary Examiner* — Thomas G Black
*Assistant Examiner* — Demetra R Smith-Stewart

(57) ABSTRACT

Systems and methods for detecting in motion railcar seismic data generated by defective railcar axles of a train traveling on a track. The method uses two or more seismic sensors on the side of the track to capture seismic noise generated by railcar wheels. A wheel that exceeds a preset seismic noise threshold in amplitude, will trigger a wheel tracking algorithm that calculates seismic phase shift data related to the actively tracked wheel noise level, to determine the precise location, in real time, of the faulty wheel carriage while moving. Knowing the precise location of the tracked wheel allows the system to isolate the railcar and capture the railcar and wheel carriage identification information.
Subsequently, a railcar log is made on a computer database with the railcar identification information and made available to control centers via ground or satellite links.

15 Claims, 4 Drawing Sheets

(56) References Cited

U.S. PATENT DOCUMENTS

| | | | |
|---|---|---|---|
| 6,553,316 B2* | 4/2003 | Bary | G01V 1/26 |
| | | | 181/112 |
| 6,751,559 B2* | 6/2004 | Fookes | G01V 1/3808 |
| | | | 367/20 |
| 7,881,501 B2* | 2/2011 | Pinnegar | G06K 9/0053 |
| | | | 367/14 |
| 7,894,301 B2* | 2/2011 | Eperjesi | G01V 1/223 |
| | | | 367/77 |
| 9,067,608 B2* | 6/2015 | Lingvall | B61L 29/284 |
| 2012/0182832 A1* | 7/2012 | Eperjesi | G01V 1/223 |
| | | | 367/77 |
| 2013/0265851 A1* | 10/2013 | Faber | G01V 1/42 |
| | | | 367/25 |
| 2015/0000415 A1* | 1/2015 | Kelley | B61L 5/12 |
| | | | 73/649 |
| 2016/0202372 A1* | 7/2016 | Duret | G01V 1/288 |
| | | | 702/16 |

* cited by examiner

AUTOMATED IN MOTION RAILWAY SEISMIC WHEEL FAILURE DETECTION SYSTEM

CROSS-REFERENCE

The inventor claim priority to a foreign application under the same name:
AUTOMATED IN MOTION RAILWAY SEISMIC WHEEL FAILURE DETECTION SYSTEM
Patent filed with the Canadian Intellectual Property Office
Canadian Patent Number: 2 870 425
Canadian Patent Filing Date (mm/dd/yyyy): Nov. 12, 2014
Canadian Patent Issue Date (mm/dd/yyyy): Dec. 29, 2015

BACKGROUND OF THE INVENTION

The present invention relates to a sensing and communication system that monitors railcar wheel seismic noise levels in real time while moving along a train rail track.

Rail is an ever expanding and increasingly important method of transporting goods and people. With the ever expanding urban areas, existing railways often carry hazardous materials very close to urban areas. Train derailments, the added danger of hazardous material contaminants, and the risk of explosions can be very costly to society and fragile ecosystems, and may cause irreversible damage to the environment and aquatic life. Faulty railcar wheel carriages also greatly contribute to noise pollution in densely populated urban areas.

Existing methods of inspecting railcars which are stationary, make it very difficult and time consuming to detect railcar axle and wheel deformations that can only be effectively detected if the railcar is moving. Installing vibration sensors on the railcar itself is costly and requires regular maintenance and calibration.

The invention is directed to cost effectively and with relative ease track the state of railcars. It provides a low cost inspection solution to scan railcars for compliance in order to mitigate the risk of environmental damage caused by derailments, and to lower train noise levels.

Since the invention works on the principle of seismic ground wave phase analysis, the sensors do not have to be installed on the rail track but can be installed within a convenient distance parallel to the track. The system can be installed as a permanent installation or through mobile deployable stations.

These sensor stations can then be deployed strategically across major rail arteries.

SUMMARY OF THE INVENTION

Systems and methods pertain to the detection of seismic noise generated by in motion railcars linked together in a train traveling on a track. The method uses at least two seismic sensors on the side of any rail track to capture seismic noise generated by railcar wheels. A wheel that exceeds a preset seismic noise threshold in amplitude will trigger a wheel tracking algorithm which calculates seismic phase data related to the actively tracked wheel noise interval, to determine the precise location of the faulty wheel or axle carriage in real time, and use this information to predict where exactly the wheel will be while within the bounds of the seismic sensors. Knowing the precise location of the faulty wheel in real time, allows the system to capture the railcar and carriage identification information while discriminating against background seismic noise.

The seismic phase information makes it possible to synchronously strobe and trigger digital cameras or sensors to record information on a specific tracked wheel carriage under investigation.

Subsequently, a railcar identification data recording is made on a computer database and made available to control centers.

The benefit of this system is a very cost effective highly accurate solution to monitor railcar compliance.

DETAILED DESCRIPTION OF THE INVENTION

Figure 1:
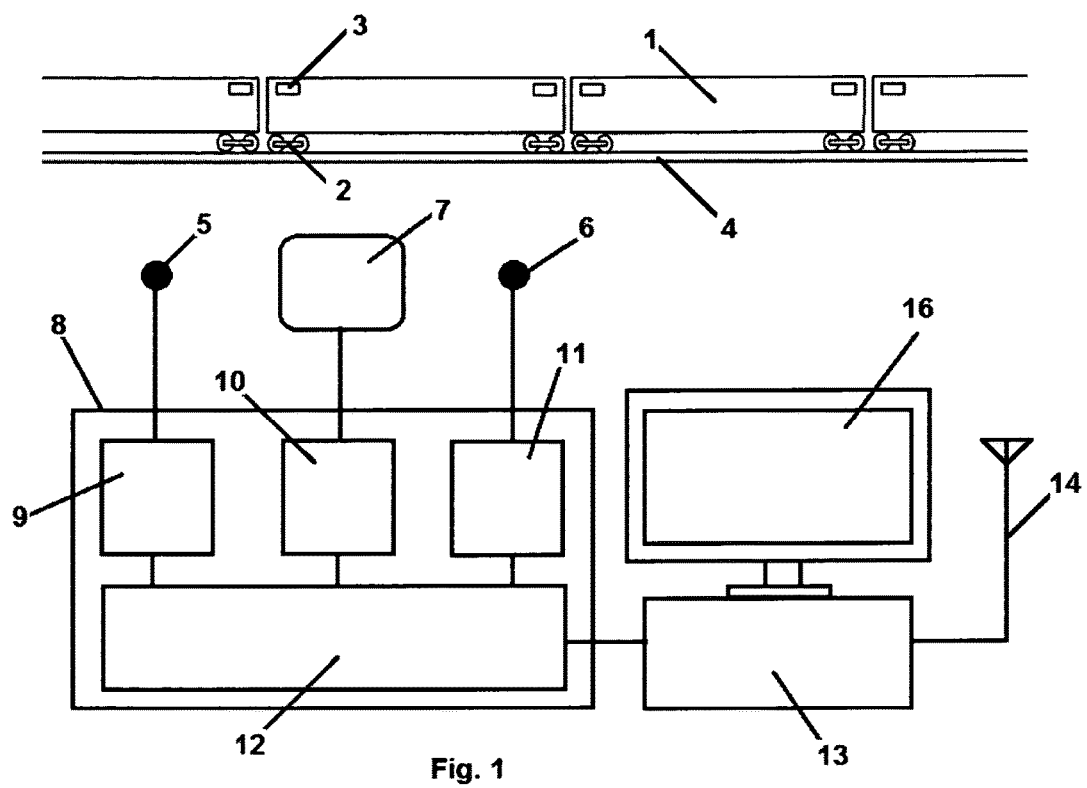
FIG. 1 is a schematic view of the rail monitoring system block diagram made in accordance with the present invention.
Figure 2:
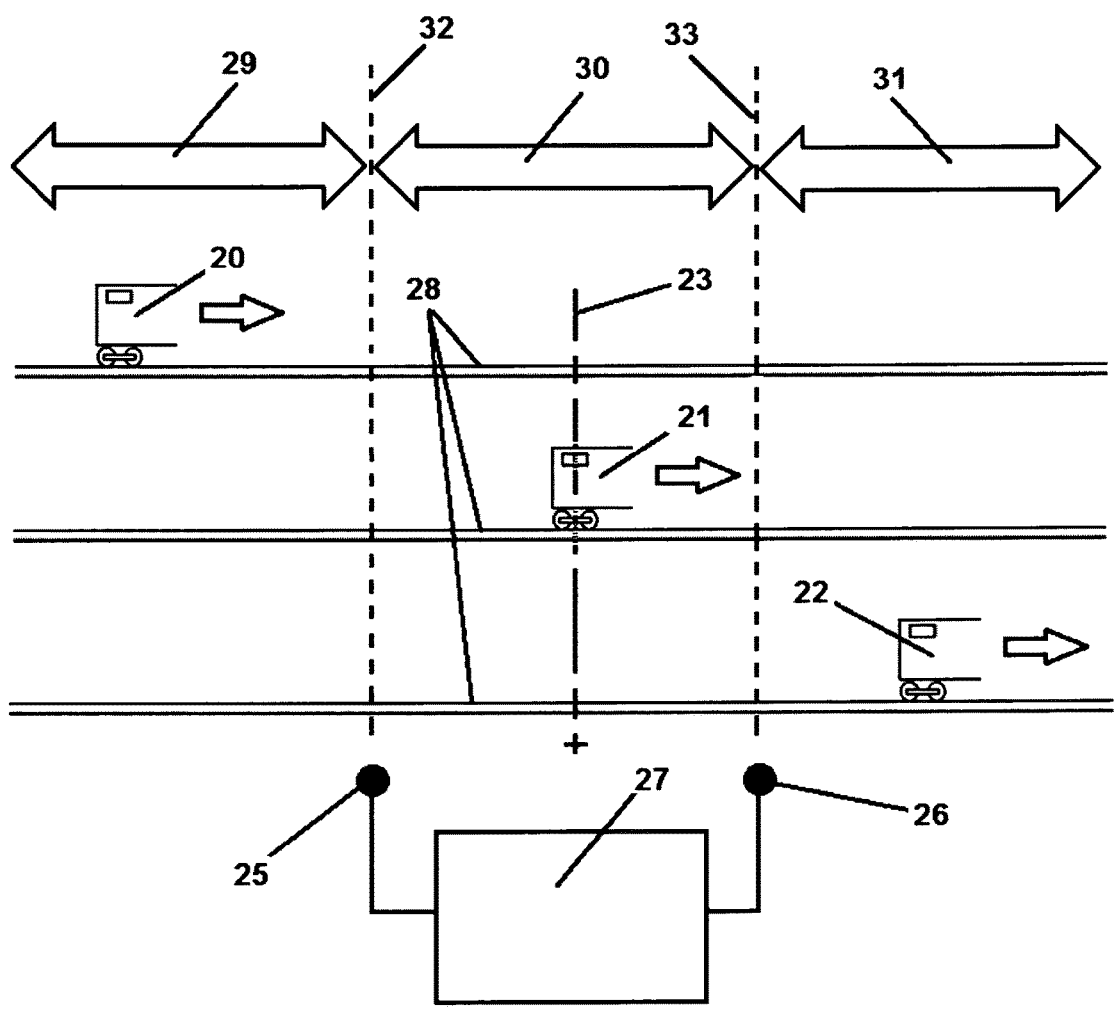
FIG. 2 is a schematic view of the seismic sensors relative to the railcar as it pertains to the phase measurements at three different points in time.
Figure 3:
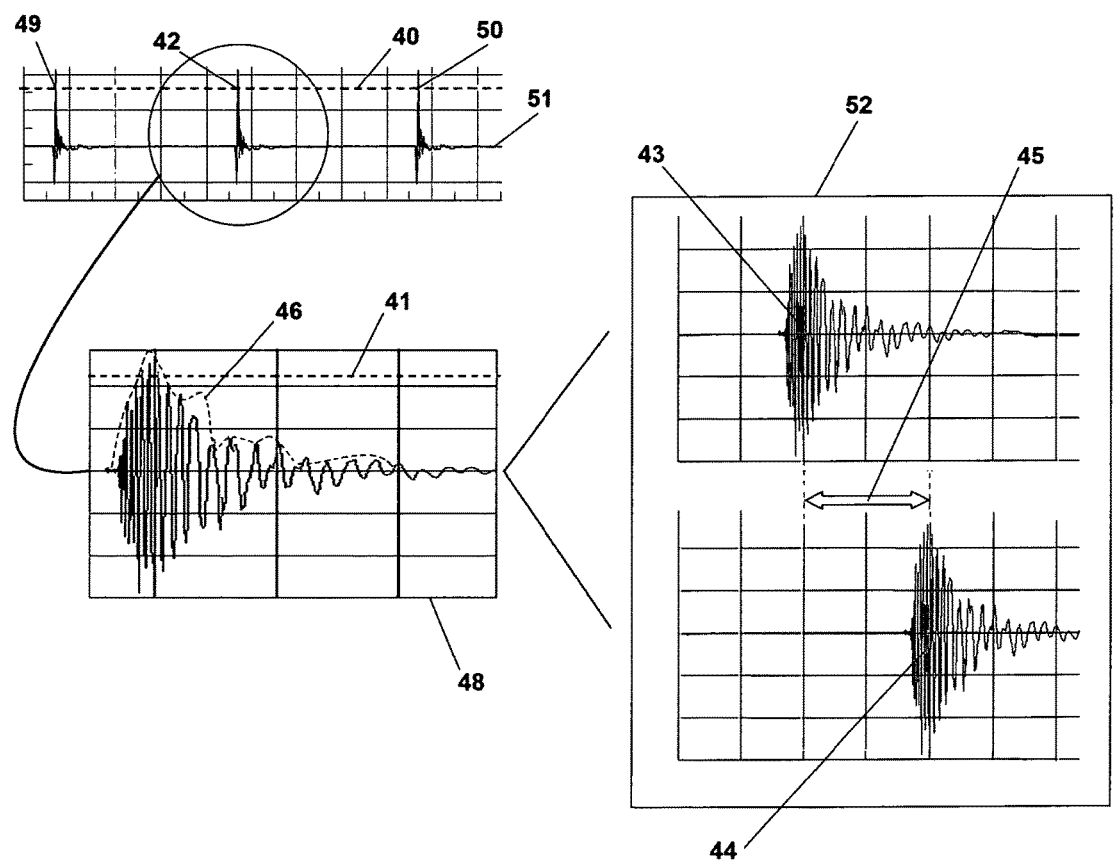
FIG. 3 is a schematic view of the signal detection, envelope recording and calculating the phase difference relationship for each seismic event interval.

With reference to the drawings and, in particular, with reference to FIGS. 1-3, the present invention is a system that in real time monitors and detects railcars in motion for noisy and potentially faulty wheels causing major seismic ground waves. Starting with FIG. 1, to measure these ground waves and in order to precisely locate and track a noisy wheel 2 that exceeds a set seismic noise amplitude threshold 40, we need at least two seismic sensors 5, 6 on the side of a rail track 4 in order to measure the phase 45 of the approaching signal source 2, 42 of interest caused by a wheel and discriminate against background noise. These seismic sensors 5, 6 can be embedded in the ground in a place with good seismic ground wave propagation on the side of a rail track or attached directly to a rail track.

Each seismic sensor has a fast acting analog to digital signal processing unit 9, 11 that is identically calibrated to give the exact same signal amplitude for a given seismic impulse event 42, 48 when placed identical distances 23, 21 from the seismic sensors 25, 26.

As the railcar moves along the track past the sensors, each sensor will then record the same analog seismic wave, however the seismic wave envelopes 43, 44 will be out of phase 20, 45 due to the time delay of the seismic wave propagation as illustrated in FIG. 3, where the first sensor signal is represented by impulse 43 and the signal for the second sensor represented by impulse 44. The main processing unit 12 a.k.a the controller, will measure whether a preset seismic amplitude threshold 40, 41 has been reached and this will cause the main processing unit 12 to lock on to the said seismic signal source 2—this is known as an event 42. A unique seismic envelope signature 46 will be recorded in memory to compare and track, using the phase information 45, the position of the railcar wheel in real time while within the bounds of the seismic sensors 25,26.

At the point of zero phase shift 23, the railcar wheel 21 of interest will be positioned in the center of the two seismic sensor 25, 26 locations.

The main processing unit 12 can use the periodic event intervals 42 to calculate the distance traveled by the wheel between each event interval 42. The speed and phase information 45 can be used to calculate where exactly the wheel will be at any given time while the wheel remains within the bounds of the seismic sensors 25,26. This phased time 45 calculation can be used to predict exactly when the wheel will be correctly aligned with a sensor, in order to trigger a phase timed programmable strobe output 10,12,7 to synchronize with, for example, a digital camera to take a precisely timed picture of the faulty wheel and any visual identification codes near the railcar wheel carriage assembly on the side of the railcar. This information plus additional identification information and the unique seismic envelope profile 48 can then be logged to a database 13, 14 and forwarded to a processing center to determine what action should be taken, such as whether or not the train should be halted, or if it will be allowed to continue for later inspection. The system may also be programmed to signal the train directly if the level of error passes a set of pre-determined criteria.

The seismic sensor Interface 8 can also detect from which direction the train 1 is traveling in order to correctly capture railcar identification information 3,7.

Once an event is triggered 42, the system has enough information to identify the railcar and the carriage axle in question 2, 7, 10. It is then up to the railcar inspector to determine the exact nature of the source of the noise related to the railcar in question.

This system can be deployed as a mobile unit or as a permanent installation.

Field calibration parameters must be entered into the system 8, 13 such as the exact location of the sensors 5, 6 in relation to the rail track 4 in order to make the phase measurements 45 work correctly.

Figure 4:
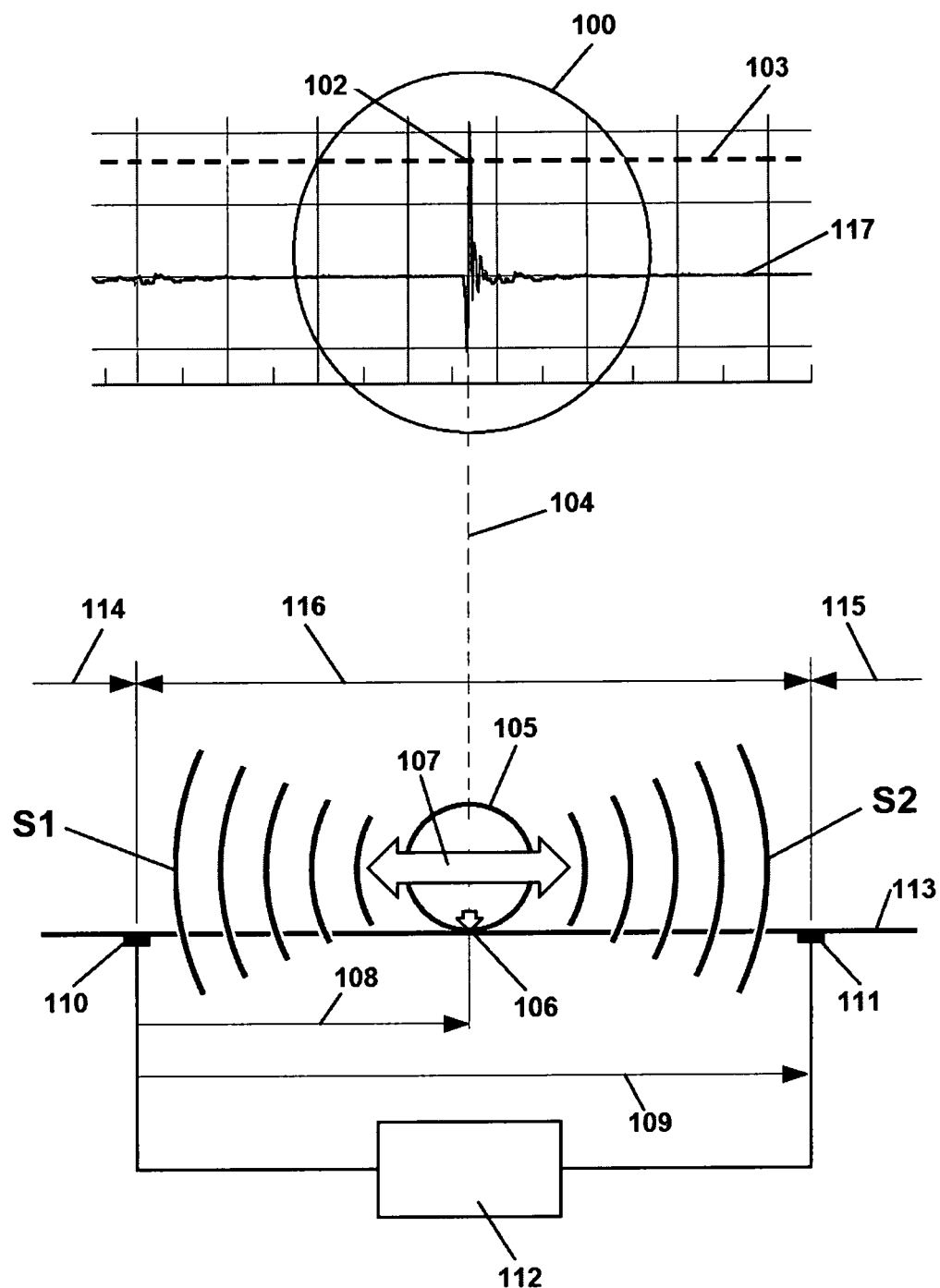
FIG. 4 is a schematic view of the faulty wheel impact seismic wave propagation and phase time measurement to calculate the absolute position of the faulty wheel impact point.

The Wheel Tracking Algorithm:

With reference to FIG. 4 in particular, to be able to determine the exact position of the faulty wheel 105 impact point 106 in real time, the following sequence of events is used to calculate the faulty wheel impact point 23,106 on a rail track 28,113 using the tracking algorithm inside the controller 8,27,112. The tracking algorithm defines three areas of interest 114,115,116 or 29,30,31.

In the active wheel impact area 116, all faulty wheel impacts 102,106 are considered as valid events where the phase time 108 is always smaller than the maximum phase time 109.

In the passive areas 114,115, all faulty wheel impacts 20, 22 are to be ignored to prevent multiple false event recordings. The system is able to ignore these impacts because in this instance the phase time will always be equal or greater than the maximum phase time 109.

In order to trigger 100, 102,103 the tracking algorithm to start the phase time measurement, a faulty wheel 105 must exceed a pre-programmed threshold 40,103 amplitude triggered from either seismic sensor 110 or 111.

Seismic impulse waves caused by a wheel impact are represented by wave S1,43 and in the opposite direction by S2,44.

The Active Wheel Impact Area Event Sequence 116:

The area between 32 and 33 is considered the active wheel impact area on the rail track 28,113. The first seismic sensor 110 or 111 to receive the seismic impulse event trigger 43,100, 42,102,103, will start a timer inside the controller 112 to measure how long it takes for the second seismic sensor 110 or 111 to also receive the same seismic impulse event S1 or S2, 100. Once the second seismic sensor has received the same signal traveling in the opposite direction 107, the timer inside the controller will be stopped. If this measured phase time 108 is smaller than the maximum allowable calibrated time 109, the controller 112 can safely assume that the faulty wheel impact 104,105,106 was indeed in between seismic sensors 110 and 111, and considered as a valid event 100,42. The controller 112,8,17 knows which seismic sensor was triggered first. The controller also knows the calibrated distance 116, 30 between seismic sensors 110 and 111. Using this information the controller can calculate the millimeter position of the faulty wheel impact point as it happens in real time relative to seismic sensor positions 110 and 111. The controller can then record the event and send a programmed high speed strobe 10 signal to trigger external devices 7 to capture the rail car identification information, e.g. high speed camera recorders and/or railcar RFID details for post analysis using the millimeter position of the wheel impact point. Recorded information may be made available on an attached computer terminal and display 13, 16.

The Passive Area Event Sequence 114 or 115:

If the faulty wheel impact point 106 is to the left of sensor 110 or to the right of sensor 111, a calibrated maximum seismic propagation time delay 109 will be measured. Since we know the seismic speed through steel, in this case, to be about 6000 m/s and we know the distance between seismic sensors 110 and 111, we can calculate and measure the maximum propagation time 109 as the wave reaches either sensor 110, 111 and then reaches the other sensor 111 or 110, to stop the measurement. Since these impact points 20,22, 49,50 originate outside the active wheel impact detection area 116, it will always register as a maximum time and allow the system to ignore the wheel impact as to be out of range either to the left of 114 or to the right of 115.

The system can be identically replicated for each track.

The embodiments of the invention in which an exclusive property or privilege is claimed are defined as follows:

1. A System for monitoring and tracking in motion seismic waves created by noisy railcar wheels comprising:
   at least two seismic sensors placed parallel to a rail track;
   with the seismic sensors measuring seismic wave signals generated by a noisy railcar wheel carriage axle, on a rail track, the wheel carriage defined as the signal source
   with the sensors spaced from each other such that seismic phase time propagation delays between sensors, in relation to the signal source, can be measured
   a controller having associated software and in communication with the seismic sensors, the controller adapted to use signals from the seismic sensors to detect a peak amplitude threshold and to measure the phase time of the signal source due to approaching seismic wave propagation, using this phase information to track the location and identify a noisy railcar wheel carriage axle while in motion; and
   with the controller also adapted to use the phase time information to provide a programmable phase timed strobe output for external synchronizations.

2. The system of claim 1, wherein the sensors are any electronic sensor capable of converting seismic signals to electrical high frequency waves to be processed by the controller.

3. The system of claim 2, wherein the seismic sensors include more than two seismic sensors for higher accuracy.

4. The system of claim 1, wherein the controller is part of a terminal that further includes a display for providing information about detected railcars.

5. The system of claim 4, wherein the system further comprises a database for storing affected railcar information.

6. The system of claim 5, where the system includes wired or wireless communication so that railcar information can be accessed remotely.

7. A system for detecting and analyzing coupled-in-motion railcar seismic noise waves comprising:
at least two seismic sensors placed parallel to a rail track;
with the seismic sensors measuring seismic wave signals generated by a noisy railcar wheel carriage axle, on a rail track, the wheel carriage defined as the signal source
with the sensors spaced from each other such that seismic phase time propagation delays between sensors, in relation to the signal source, can be measured
a controller having associated software and in communication with the seismic sensors, the controller adapted to use signals from the seismic sensors to detect a peak amplitude threshold and to measure the phase time of the signal source due to approaching seismic wave propagation, using this phase information to track the location and identify a noisy railcar wheel carriage axle while in motion; and
with the controller also adapted to use the phase time information to provide a programmable phase timed strobe output for external synchronizations.

8. The system of claim 7, wherein the sensors are any electronic sensor capable of converting ground seismic signals to electrical high frequency waves to be processed by the controller.

9. The system of claim 8, wherein the seismic sensors can include more than two seismic sensors to increase accuracy.

10. The system of claim 7, wherein the controller is part of a terminal that further includes a display for providing information about detected railcars.

11. The system of claim 10, wherein the system further comprises a database for storing railcar information.

12. The system of claim 11, where the system includes wired or wireless communication so that railcar information can be accessed remotely.

13. A method for detecting, tracking and identifying coupled-in-motion railcar seismic noise waves created by railcar wheels comprising:
positioning at least two seismic sensors on the side of a rail track;
measuring seismic wave signals generated by a noisy railcar wheel carriage on a track, the wheel carriage defined as the signal source
spacing these sensors from each other such that seismic phase time propagation delays between censors, in relation to the signal source, can be measured
measuring seismic waves from the signal source, to determine if the wheel of a railcar exceeds a peak amplitude threshold in order to trigger an event; then calculating using the phase difference of the sensors' seismic propagation time, the exact wheel carriage position relative to the seismic sensors, as well as the direction and speed of movement of the railcar
using a controller having associated software and in communication with the seismic sensors; using signals from the seismic sensors to detect a peak amplitude threshold; measuring the phase time of the wheel signal source due to approaching seismic wave propagation; using this phase information to track the location of the faulty wheel in real time, identifying a noisy wheel carriage axle while in motion; and
using the phase time information to provide a programmable phase timed strobe output for external synchronizations.

14. The method of claim 13, wherein the controller is part of a terminal that further includes a display with, information about detected railcars being displayed.

15. The method of claim 13, wherein storing the faulty railcar information in a database associated with the terminal, the terminal further including wired or wireless communication functionality so that railcar data can be exported or accessed remotely across the internet.

\* \* \* \* \*